(12) United States Patent
Ichikawa

(10) Patent No.: US 10,875,421 B2
(45) Date of Patent: Dec. 29, 2020

(54) POWER CONTROL SYSTEM AND VEHICLE

(71) Applicant: Toyota Jidosha Kabushiki Kaisha, Toyota (JP)

(72) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 16/193,642

(22) Filed: Nov. 16, 2018

(65) Prior Publication Data
US 2019/0160956 A1    May 30, 2019

(30) Foreign Application Priority Data
Nov. 24, 2017    (JP) .................................. 2017-225970

(51) Int. Cl.
*B60L 55/00* (2019.01)
*H02J 7/35* (2006.01)

(52) U.S. Cl.
CPC .................. *B60L 55/00* (2019.02); *H02J 7/35* (2013.01)

(58) Field of Classification Search
CPC .................................... B60L 55/00; H02J 7/35
USPC ......................................................... 307/9.1
See application file for complete search history.

(56) References Cited

U.S. PATENT DOCUMENTS

| | | | | |
|---|---|---|---|---|
| 5,362,942 A * | 11/1994 | Vanderslice, Jr. | ........ | H02J 7/00 219/209 |
| 7,891,451 B2 * | 2/2011 | Oyobe | .................. | H02J 7/0044 180/65.275 |
| 8,638,063 B2 * | 1/2014 | Paryani | .................... | B60L 53/63 320/109 |
| 8,772,961 B2 * | 7/2014 | Ichikawa | ................ | B60L 1/006 307/9.1 |
| 8,817,501 B1 * | 8/2014 | Low | ....................... | H02M 3/073 363/60 |
| 9,041,355 B2 * | 5/2015 | Ishibashi | ................. | B60L 58/15 320/134 |
| 2009/0189571 A1 * | 7/2009 | Lai | ...................... | H02M 1/4225 320/162 |
| 2012/0293218 A1 * | 11/2012 | Dewa | ................... | H03K 17/785 327/109 |
| 2014/0306533 A1 * | 10/2014 | Paquin | ...................... | H02J 1/00 307/52 |

(Continued)

FOREIGN PATENT DOCUMENTS

| | | |
|---|---|---|
| JP | 5123419 B1 | 1/2013 |
| WO | 2013/030637 A2 | 3/2013 |

*Primary Examiner* — Alfonso Perez Borroto
(74) *Attorney, Agent, or Firm* — Dinsmore & Shohl LLP

(57) ABSTRACT

A power control system includes: an ECU configured to control (i) charging from a power facility to a vehicle and (ii) discharging from the vehicle to the power facility; and a user terminal configured to allow a user to separately set a charging power setting value and a discharging power setting value. When the charging from the power facility to the vehicle is performed, the ECU is configured to control power charged to the vehicle per unit time to correspond to the charging power setting value set by the user using the user terminal. When the discharging from the vehicle to the power facility is performed, the ECU is configured to control power discharged from the vehicle per unit time to correspond to the discharging power setting value set by the user using the user terminal.

7 Claims, 5 Drawing Sheets

(56) References Cited

U.S. PATENT DOCUMENTS

| | | | |
|---|---|---|---|
| 2015/0066228 A1* | 3/2015 | Clifton | H02J 3/382 |
| | | | 700/295 |
| 2015/0147630 A1* | 5/2015 | Nakano | H01M 4/13 |
| | | | 429/156 |
| 2015/0183329 A1* | 7/2015 | Nakaya | B60L 53/14 |
| | | | 307/9.1 |
| 2016/0336767 A1* | 11/2016 | Zane | H02J 7/0068 |
| 2016/0368385 A1* | 12/2016 | Yim | B60L 7/14 |
| 2017/0141576 A1* | 5/2017 | Gutenmann | H02J 3/383 |
| 2017/0163170 A1* | 6/2017 | Tahata | H02M 7/483 |
| 2017/0250419 A1* | 8/2017 | Yamaue | H01M 8/04231 |
| 2017/0302105 A1* | 10/2017 | Toyoda | H02M 7/217 |
| 2018/0037121 A1* | 2/2018 | Narla | B60L 53/51 |
| 2018/0102647 A1* | 4/2018 | Ohnishi | H02J 3/0073 |
| 2018/0152046 A1* | 5/2018 | Toyoda | H02J 9/062 |
| 2018/0212460 A1* | 7/2018 | Shibata | H02J 9/061 |
| 2018/0337536 A1* | 11/2018 | Li | H02J 7/0091 |
| 2019/0020281 A1* | 1/2019 | Yang | H02M 3/3376 |
| 2019/0181677 A1* | 6/2019 | Toyoda | H02M 7/48 |
| 2019/0334376 A1* | 10/2019 | Toyoda | H02J 9/062 |
| 2019/0379269 A1* | 12/2019 | Huntgeburth | H02K 47/04 |

\* cited by examiner

POWER CONTROL SYSTEM AND VEHICLE

CROSS-REFERENCE TO RELATED APPLICATIONS

This nonprovisional application claims priority to Japanese Patent Application No. 2017-225970 filed on Nov. 24, 2017, with the Japan Patent Office, the entire contents of which are hereby incorporated by reference.

BACKGROUND

Field

The present disclosure relates to a power control system configured to control power exchanged between a power facility and a vehicle, as well as the vehicle configured to exchange power with the power facility.

Description of the Background Art

Japanese Patent No. 5123419 discloses an electrically powered vehicle including a charging port connectable to a power facility. When the power facility is connected to the charging port, the vehicle is configured to selectively perform (i) charging from the power facility to the vehicle and (ii) discharging from the vehicle to the power facility.

SUMMARY

In future, in response to an increase in capacities of power storage devices of vehicles, it is expected that needs will grow in effectively utilizing power stored in a power storage device of a vehicle by regularly taking the power out of the vehicle. For example, it is expected that needs will grow in: lowering peak power by taking power out of the vehicle during a time period during which power consumption in a house reaches a peak; and storing, into the power storage device of the vehicle, power generated by a solar panel during daytime, taking the power out of the vehicle during nighttime, and utilizing the power.

Therefore, in future, in a vehicle including a power storage device configured to be charged from and discharged to a power facility, it will be desired to appropriately manage not only charging but also discharging of the power storage device of the vehicle in accordance with a situation.

The present disclosure has been made to solve the above-described problem, and has an object to appropriately manage charging and discharging of a power storage device of a vehicle in accordance with a situation, the power storage device being configured to be charged from and discharged to a power facility.

(1) A power control system according to the present disclosure is configured to control power exchanged between a power facility and a vehicle. This power control system includes: a control device configured to control (i) charging from the power facility to the vehicle and (ii) discharging from the vehicle to the power facility; and a setting device configured to allow a user to separately set a charging power setting value and a discharging power setting value. When the charging from the power facility to the vehicle is performed, the control device is configured to control power charged to the vehicle per unit time to correspond to the charging power setting value set by the user using the setting device. When the discharging from the vehicle to the power facility is performed, the control device is configured to control power discharged from the vehicle per unit time to correspond to the discharging power setting value set by the user using the setting device.

According to the above-described system, the user can separately set the charging power setting value and the discharging power setting value using the setting device. Accordingly, the actual charging power (charging speed) and discharging power (discharging speed) for the power storage device of the vehicle can be independently matched to respective magnitudes suitable to respective situations. Hence, the charging and discharging of the power storage device of the vehicle can be appropriately managed in accordance with a situation.

(2) In a certain embodiment, a range of the discharging power setting value settable by the user using the setting device is larger than a range of the charging power setting value settable by the user using the setting device.

According to the above-described embodiment, the adjustment range of the discharging power can be secured to be wider than the adjustment range of the charging power. Accordingly, requests for discharging by the user can be responded in many cases. On the other hand, the adjustment range of the charging power setting value is restricted to be smaller than the adjustment range of the discharging power setting value. Accordingly, power supplied from the power facility to the vehicle can be suppressed from being varied excessively. This leads to suppression of occurrence of large power variation in other devices connected to the power facility due to the supply of power from the power facility to the vehicle.

(3) In a certain embodiment, a maximum value of the discharging power setting value settable by the user using the setting device is larger than a maximum value of the charging power setting value settable by the user using the setting device.

According to the above-described embodiment, the maximum value of the discharging power is set to be larger than the maximum value of the charging power. Hence, even when the user requests to promptly discharge power from the vehicle to the power facility, the request can be responded. On the other hand, the maximum value of the charging power is restricted to be smaller than the maximum value of the discharging power. Accordingly, the power supplied from the power facility to the vehicle is suppressed from being too large. This leads to suppression of occurrence of great decrease of power in other devices connected to the power facility due to the supply of power from the power facility to the vehicle.

(4) In a certain embodiment, the setting device is provided in a communication terminal that is able to be carried by the user of the vehicle.

According to the above-described embodiment, even when the user is at a location distant away from the vehicle or the power facility, the user can set the charging power setting value and the discharging power setting value from the communication terminal (such as a smartphone) carried by the user.

(5) A vehicle according to the present disclosure is configured to exchange power with a power facility. This vehicle includes: a control device configured to control (i) charging from the power facility to the vehicle and (ii) discharging from the vehicle to the power facility; and a setting device configured to allow a user to separately set a charging power setting value and a discharging power setting value. When the charging from the power facility to the vehicle is performed, the control device is configured to control power charged to the vehicle per unit time to correspond to the charging power setting value set by the user using the setting device. When the discharging from the vehicle to the power facility is performed, the control device is configured to control power discharged from the vehicle per unit time to correspond to the discharging power setting value set by the user using the setting device.

According to the above-described vehicle, the user can separately set the charging power setting value and the discharging power setting value using the setting device. Accordingly, the actual charging power (charging speed) and discharging power (discharging speed) for the power storage device of the vehicle can be independently matched to respective magnitudes suitable to respective situations. Hence, the charging and discharging of the power storage device of the vehicle can be appropriately managed in accordance with a situation.

(6) In a certain embodiment, a range of the discharging power setting value settable by the user using the setting device is larger than a range of the charging power setting value settable by the user using the setting device.

According to the above-described embodiment, the adjustment range of the discharging power is secured to be wider than the adjustment range of the charging power. Accordingly, requests for discharging by the user can be responded in many cases. On the other hand, the adjustment range of the charging power setting value is restricted to be smaller than the adjustment range of the discharging power setting value. Accordingly, power supplied from the power facility to the vehicle can be suppressed from being varied excessively. This leads to suppression of occurrence of large power variation in other devices connected to the power facility due to the supply of power from the power facility to the vehicle.

(7) In a certain embodiment, a maximum value of the discharging power setting value settable by the user using the setting device is larger than a maximum value of the charging power setting value settable by the user using the setting device.

According to the above-described embodiment, the maximum value of the discharging power is set to be larger than the maximum value of the charging power. Hence, even when the user requests to promptly discharge power from the vehicle to the power facility, the request can be responded. On the other hand, the maximum value of the charging power is restricted to be smaller than the maximum value of the discharging power. Accordingly, the power supplied from the power facility to the vehicle is suppressed from being too large. This leads to suppression of occurrence of great decrease of power in other devices connected to the power facility due to the supply of power from the power facility to the vehicle.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
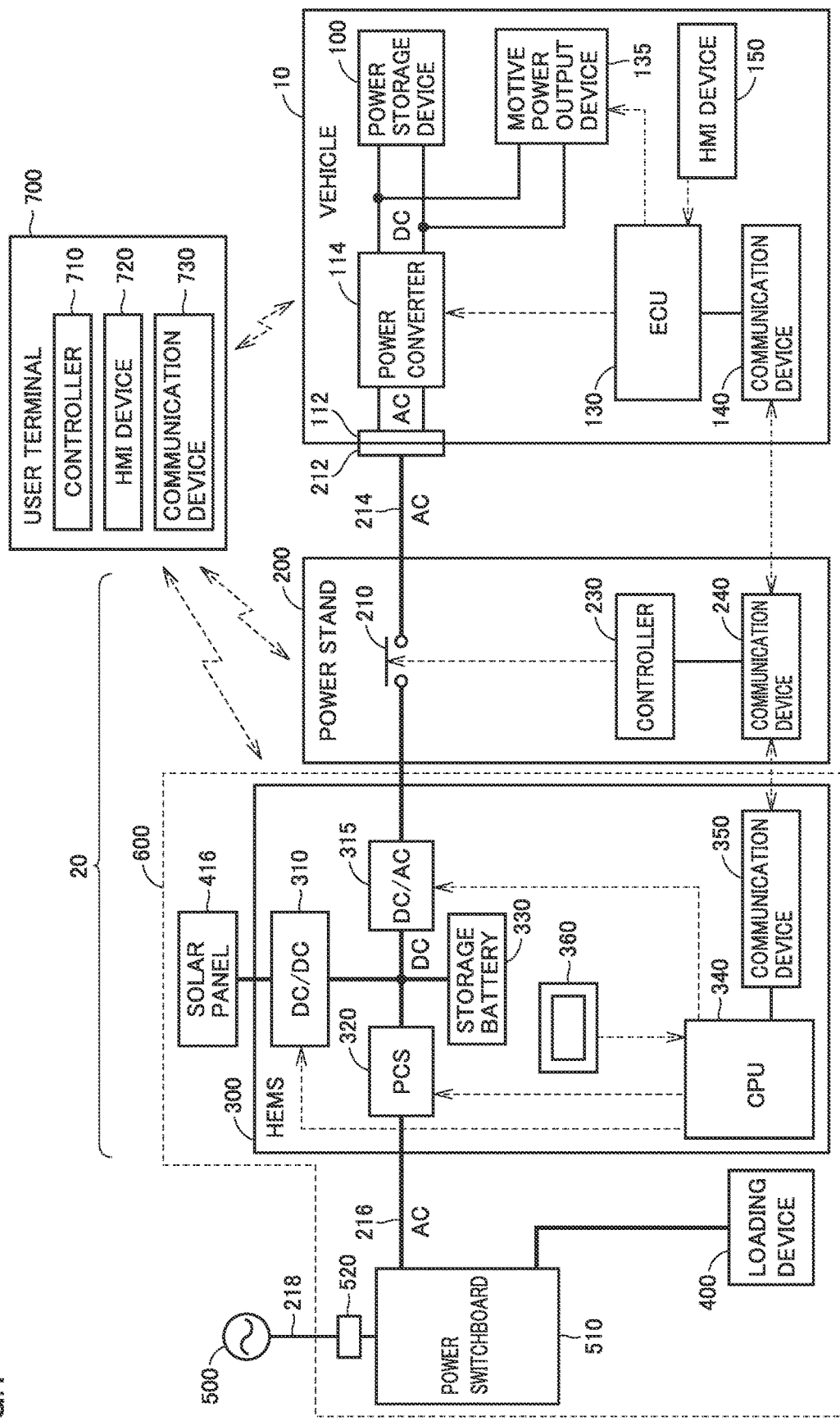
FIG. 1 is a diagram schematically showing an entire configuration of a power control system.

The following describes the present embodiment with reference to figures in detail. It should be noted that the same or corresponding portions in the figures are given the same reference characters and are not described repeatedly.

In the present disclosure, the term "power" may mean electric power in a narrow sense (rate of doing work), or may mean electric power in a broad sense such as amount of electric power (amount of work) or electric energy, and is flexibly interpreted depending on a context in which the term is used.

<Entire Configuration>

FIG. 1 schematically shows an entire configuration of a power control system including a vehicle according to the present embodiment. The power control system includes a vehicle 10, a power facility 20, a loading device 400, a commercial system power supply 500, a power switchboard 510, and a user terminal 700. Power facility 20 includes a power stand 200, a HEMS (Home Energy Management System) 300, and a solar panel 416. HEMS 300, loading device 400, solar panel 416, and power switchboard 510 are provided in a house 600.

Vehicle 10 is an electrically powered vehicle configured to generate driving power for traveling using electric power and to exchange electric power with power stand 200. It should be noted that the configuration of the electrically powered vehicle is not particularly limited as long as the electrically powered vehicle can travel using electric power. Examples of vehicle 10 include a hybrid vehicle, an electric vehicle, and the like.

Vehicle 10 includes a power storage device 100, a connector 112, a power converter 114, a motive power output device 135, an ECU (Electronic Control Unit) 130 for controlling a general operation of vehicle 10, a communication device 140, and a HMI (Human Machine Interface) device 150.

Vehicle 10 can charge power storage device 100 using power supplied from power stand 200. Moreover, vehicle 10 can also discharge power of power storage device 100 to power stand 200.

Power storage device 100 is a re-chargeable power storage element. Representatively, a secondary battery is applied thereto, such as a lithium ion battery or a nickel-metal hydride battery. Alternatively, power storage device 100 may be constituted of a power storage element other than a battery, such as an electric double layer capacitor.

Connector 112 is connectable to a connector 212 provided at the tip of a power cable 214 of power stand 200.

Power converter 114 is connected between power storage device 100 and connector 112. Power converter 114 is controlled in accordance with a control signal from ECU 130. When charging power storage device 100 with power supplied from power stand 200, power converter 114 converts the power supplied from power stand 200 into power with which power storage device 100 can be charged. On the other hand, when discharging power from power storage device 100 to power stand 200, power converter 114 converts power of power storage device 100 into power that can be received by power stand 200. Power converter 114 is a bidirectional AC/DC converter, for example.

Motive power output device 135 generates driving power of vehicle 10 using the electric power stored in power storage device 100. Specifically, motive power output device 135 generates driving power of vehicle 10 based on a driving command signal from ECU 130, and outputs the generated driving power to driving wheels (not shown) of vehicle 10. Moreover, when motive power output device 135 receives an electric power generation command signal from ECU 130, motive power output device 135 generates electric power and supplies the electric power to power storage device 100.

Communication device 140 is an interface for communicating with devices external to the vehicle (such as power stand 200, HEMS 300, and user terminal 700). Communication device 140 is connected to ECU 130 via a communication line, transmits, to a device external to the vehicle, information sent from ECU 130, and sends, to ECU 130, information received from a device external to the vehicle.

HMI device 150 is a device configured to provide various information to the user of vehicle 10 and receive an operation of the user of vehicle 10. HMI device 150 includes a display including a touch panel, a speaker, and the like.

Further, although not shown in the figure, vehicle 10 includes a plurality of sensors for detecting various physical quantities required for control of vehicle 10, such as: a vehicle speed sensor configured to detect a vehicle speed; and a monitoring sensor configured to detect a state (voltage, current, temperature, or the like) of power storage device 100. Each of these sensors outputs a detection result to ECU 130.

ECU 130 includes a CPU (Central Processing Unit) and a memory (not shown), and controls each device of vehicle 10 based on information stored in the memory or information from each sensor. It should be noted that they can be controlled by not only a process performed by software but also a process performed by dedicated hardware (electronic circuit) constructed therefor.

Via communication device 140, ECU 130 performs wireless or wired communication with communication devices 240, 350, 730 respectively provided in power stand 200, HEMS 300, and user terminal 700 external to the vehicle.

Power stand 200 is a facility for charging or discharging vehicle 10. Power stand 200 includes power cable 214, a relay 210, a controller 230, and communication device 240. Power stand 200 is electrically connected to power switchboard 510 via HEMS 300. It should be noted that power stand 200 may be provided inside house 600.

Power cable 214 has one end connected to relay 210, and has the other end provided with connector 212. When supplying power to vehicle 10 and receiving power from vehicle 10, connector 212 of power cable 214 is connected to connector 112 of vehicle 10 and relay 210 is closed. An operation of opening and closing relay 210 is controlled by controller 230.

HEMS 300 is electrically connected to power switchboard 510, power stand 200, and solar panel 416. HEMS 300 includes a DC/DC converter 310, a DC/AC converter 315, a PCS (Power Conditioning System) 320, a storage battery 330, a CPU 340, a communication device 350, and an operation panel 360.

DC/DC converter 310, DC/AC converter 315, and PCS 320 are controlled by CPU 340.

DC/DC converter 310 is connected to solar panel 416 installed on a roof of house 600. DC/DC converter 310 converts, into an appropriate value, a DC voltage value of power generated by solar panel 416.

DC/AC converter 315 is connected to vehicle 10 via power stand 200. DC/AC converter 315 converts, into DC power, AC power supplied from vehicle 10 via power stand 200, and outputs the DC power to PCS 320 and storage battery 330. Moreover, DC/AC converter 315 converts, into AC power, DC power supplied from at least one of DC/DC converter 310, PCS 320, and storage battery 330, and outputs the AC power to vehicle 10 via power stand 200.

PCS 320 is connected to system power supply 500 via power switchboard 510 by power cable 216. It should be noted that system power supply 500 is representatively constituted of a single-phase AC power supply. PCS 320 converts, into DC power, AC power supplied from system power supply 500 via power switchboard 510, and outputs the DC power to DC/AC converter 315 and storage battery 330. Meanwhile, PCS 320 can convert, into AC power, DC power supplied from at least one of DC/DC converter 310, storage battery 330, and DC/AC converter 315 (power storage device 100 of vehicle 10), and can output the AC power to system power supply 500 via power switchboard 510.

Storage battery 330 is a re-chargeable power storage element, and a secondary battery such as a lithium ion battery, a nickel-metal hydride battery, or a lead storage battery is applied thereto representatively. In addition to power from vehicle 10, power generated by solar panel 416 installed on house 600 is supplied to storage battery 330 via DC/DC converter 310. Furthermore, storage battery 330 can be supplied with power from system power supply 500.

Operation panel 360 is operated by a user of HEMS 300. Operation panel 360 is configured for selection of (i) start and end of supply of power to vehicle 10 and (ii) start and end of reception of power from vehicle 10. CPU 340 transmits, to controller 230 via communication devices 350, 240, a command signal corresponding to an operation performed by the user via operation panel 360. Controller 230 controls relay 210 in accordance with the command signal from CPU 340.

A breaker 520 is provided at a power line 218 that connects system power supply 500 and power switchboard 510 to each other. Breaker 520 is configured to disconnect system power supply 500 and power switchboard 510 from each other by cutting off power line 218 when an excessive amount of current exceeding a permissible value flows in power line 218. It should be noted that for example, breaker 520 may be configured to be melted and disconnected when a current exceeding the permissible value flows, such as a current fuse. Breaker 520 may be configured to switch a relay to the open state when a current exceeding the permissible value is detected by a current sensor or the like.

Loading device 400 is any electric device configured to operate when receiving power from power switchboard 510. Loading device 400 is a home electric appliance used in house 600, for example.

User terminal 700 is a communication terminal (smartphone or the like) that can be carried by the user of vehicle 10. User terminal 700 includes a controller 710, an HMI device 720, and a communication device 730.

HMI device 720 is a device configured to provide various information to the user and receive an operation of the user. HMI device 720 includes a display including a touch panel.

Communication device 730 is an interface for wirelessly communicating with vehicle 10, power stand 200, and HEMS 300.

Controller 710 includes a CPU and a memory (not shown), and controls each device (HMI device 720, communication device 730, and the like) of user terminal 700 based on information stored in the memory, a content input into HMI device 720, and the like.

<Separate Setting of Charging Power and Discharging Power by User>

Conventionally, in power management for power storage devices of vehicles, a priority has been given to securing a traveling distance of a vehicle by efficiently charging a power storage device of the vehicle. In future, in response to an increase in capacities of power storage devices of vehicles, it is expected that needs will grow in effectively utilizing power of a power storage device of a vehicle by regularly taking the power out of the vehicle. For example, it is expected that needs will grow in: taking power out of the vehicle during a time period during which power consumption in a house reaches a peak, so as to utilize the power to lower peak power; and temporarily storing, in the vehicle, power generated by a solar panel during daytime, and taking the power out of the vehicle during nighttime.

In order to satisfy such needs, the power control system according to the present embodiment is configured to appropriately manage charging and discharging between power stand 200 and the power storage device of vehicle 10 in accordance with a situation. Specifically, the power control system is configured to allow the user to separately set (i) power (hereinafter, also simply referred to as "charging power") charged from power stand 200 to power storage device 100 of vehicle 10 per unit time, and (ii) power (hereinafter, also simply referred to as "discharging power") discharged from power storage device 100 of vehicle 10 to power stand 200 per unit time.

The following describes a method for separately setting the charging power and discharging power by the user. In the description below, it will be illustratively described that the user operates user terminal 700 to separately set the charging power and the discharging power.

Figure 2:
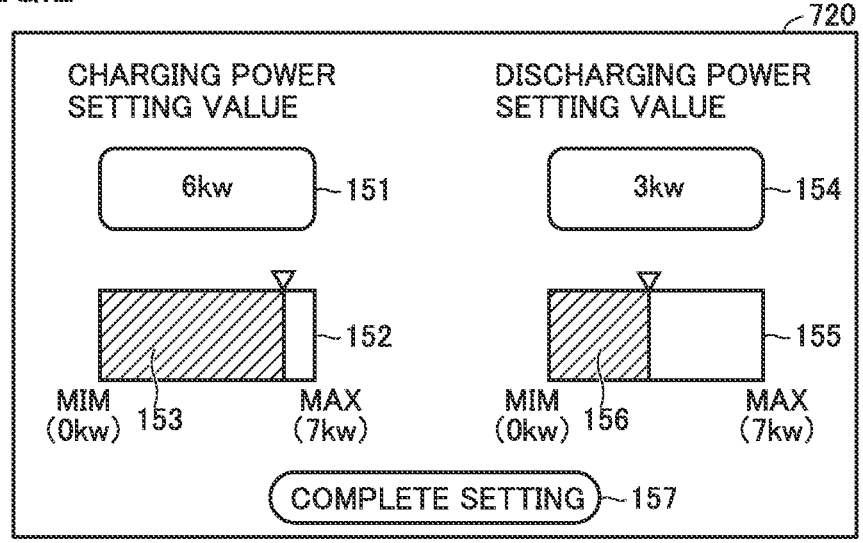
FIG. 2 is a first diagram showing an exemplary setting screen presented on a user terminal.

FIG. 2 shows an exemplary setting screen presented on the display of HMI device 720 of user terminal 700. As shown in FIG. 2, in this setting screen, numerical value indications 151, 154, setting bars 152, 155, indication bars 153, 156, and a setting completion button 157 are presented.

Numerical value indication 151 presents a current charging power setting value in the form of a numerical value. Numerical value indication 154 presents a current discharging power setting value in the form of a numerical value.

The left end of setting bar 152 corresponds to the minimum value of the charging power that can be set by the user, and the right end of setting bar 152 corresponds to the maximum value of the charging power that can be set by the user. That is, the width of setting bar 152 represents a range of the charging power that can be set by the user.

The left end of setting bar 155 corresponds to the minimum value of the discharging power that can be set by the user, and the right end of setting bar 155 corresponds to the maximum value of the discharging power that can be set by the user. That is, the width of setting bar 155 represents a range of the discharging power that can be set by the user.

Indication bar 153 presents the current charging power setting value on setting bar 152. Indication bar 156 presents the current discharging power setting value on setting bar 155.

FIG. 2 shows an example in which both the minimum values of the charging power and discharging power that can be set by the user are "0 kw" and both the maximum values of the charging power and discharging power that can be set by the user are "7 kw". Therefore, in the example shown in FIG. 2, the respective ranges of both the charging power and discharging power that can be set by the user are set to the same range of "0 kw to 7 kw". Moreover, FIG. 2 shows an example in which the current charging power setting value is "6 kw" and the current discharging power setting value is "3 kw". It should be noted that in FIG. 2, the width of setting bar 152 and the width of setting bar 155 are presented on the same scale.

The user can check the current charging power setting value and the discharging power setting value by seeing numerical value indications 151, 154 or indication bars 153, 156 in the setting screen shown in FIG. 2.

The user can increase the charging power setting value by touching the right end of indication bar 153 presented on setting bar 152 and sliding it to the right. Likewise, the user can decrease the charging power setting value by touching the right end of indication bar 153 and sliding it to the left. These operations are operations of setting the charging power by the user.

The user can increase the discharging power setting value by touching the right end of indication bar 156 presented on setting bar 155 and sliding it to the right. Likewise, the user can decrease the discharging power setting value by touching the right end of indication bar 153 and sliding it to the left. These operations are operations of setting the discharging power by the user.

By touching setting completion button 157, the user can complete the settings of the charging power setting value and discharging power setting value.

When the user touches setting completion button 157, information indicating the current charging power setting value and the discharging power setting value is transmitted from user terminal 700 to vehicle 10, and is stored in the memory of ECU 130 of vehicle 10.

When charging from power stand 200 to vehicle 10 is performed, ECU 130 of vehicle 10 reads the charging power setting value stored in the memory (that is, the charging power setting value set by the user using user terminal 700) and controls power converter 114 to attain actual charging power corresponding to the charging power setting value.

When discharging from vehicle 10 to power stand 200 is performed, ECU 130 of vehicle 10 reads the discharging power setting value stored in the memory (that is, the discharging power setting value set by the user using user terminal 700) and controls power converter 114 to attain actual discharging power corresponding to the discharging power setting value.

Figure 3:
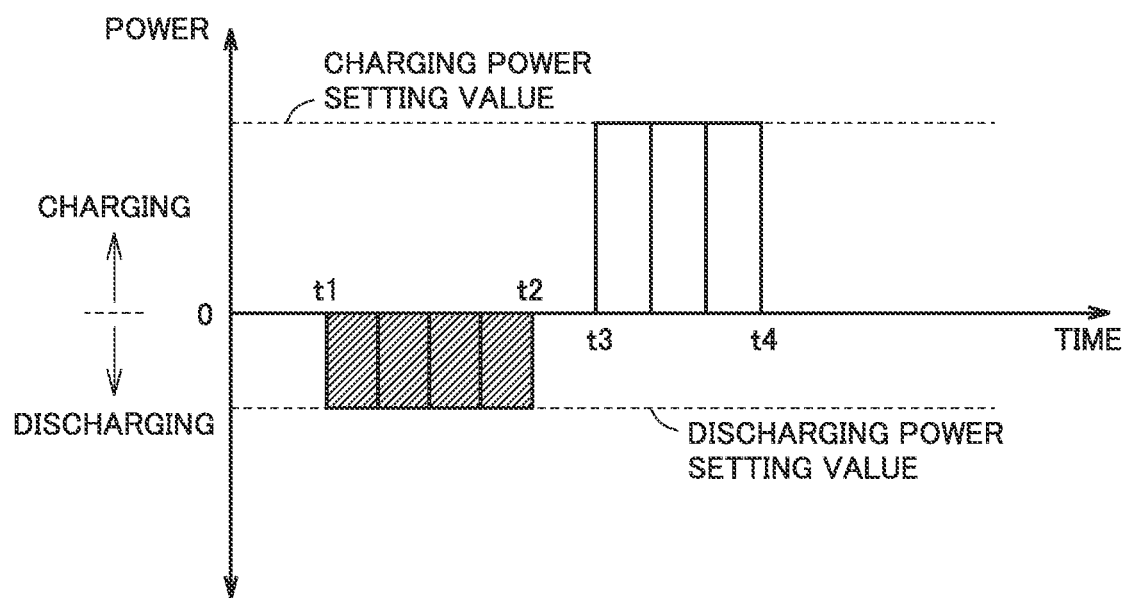
FIG. 3 is a diagram showing exemplary discharging power and charging power.

FIG. 3 shows exemplary discharging power and charging power controlled by the power control system according to the present embodiment. In FIG. 3, the horizontal axis represents time and the vertical axis represents power.

In the example shown in FIG. 3, during a period of time t1 to t2, discharging from vehicle 10 to power stand 200 is performed, whereas during a period of time t3 to t4, charging from power stand 200 to vehicle 10 is performed.

During the period of time t1 to t2 during which the discharging is performed, the discharging power is adjusted to correspond to the discharging power setting value set by the user.

During the period of time t3 to t4 during which the charging is performed, the charging power is adjusted to correspond to the charging power setting value set by the user.

Figure 4:
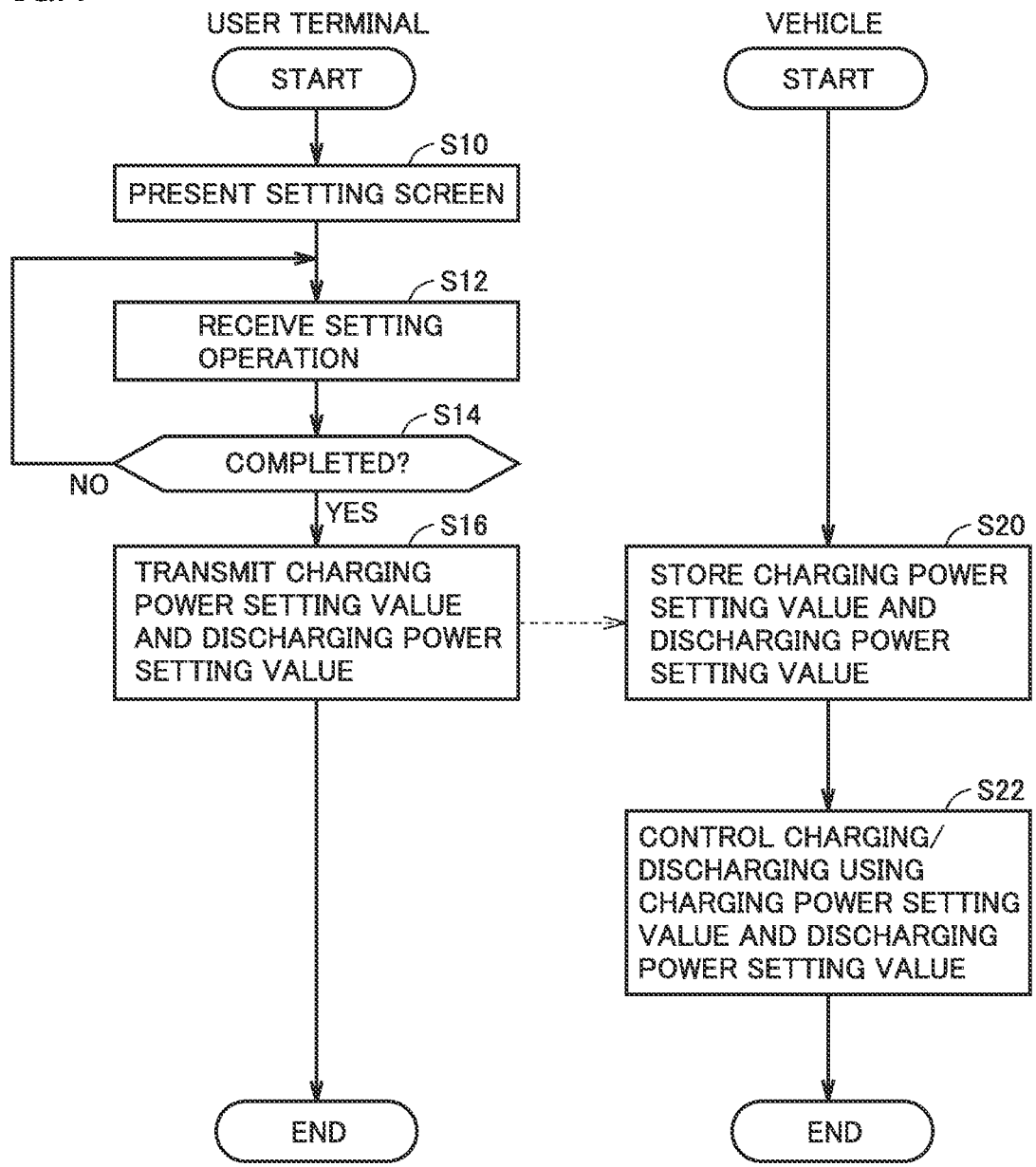
FIG. 4 is a flowchart showing an exemplary procedure of processes performed by the user terminal and a vehicle.

FIG. 4 is a flowchart showing an exemplary procedure of processes performed by user terminal 700 and vehicle 10. In FIG. 4, the process of user terminal 700 is shown on the left side, whereas the process of vehicle 10 is shown on the right side.

When the user performs an operation of requesting to set the charging power and the discharging power, user terminal 700 (more specifically, controller 710 of user terminal 700) presents the setting screen shown in FIG. 2 on the display of HMI device 720 (step S10).

Next, user terminal 700 receives the user's operation of setting the charging power and the discharging power (operation on indication bars 153, 156 of FIG. 2) (step S12).

Next, user terminal 700 determines whether or not the user has completed the setting operation by touching setting complete button 157 (step S14).

When the setting operation has not been completed (NO in step S14), user terminal 700 returns the process to step S12.

When the setting operation has been completed (YES in step S14), user terminal 700 transmits, to vehicle 10, the charging power setting value and discharging power setting value set by the user (step S16).

Vehicle 10 (more specifically, ECU 130 of vehicle 10) stores, into the memory, the charging power setting value and discharging power setting value received from user terminal 700 (step S20).

Then, vehicle 10 controls charging and discharging of vehicle 10 using the charging power setting value and the discharging power setting value (step S22). Specifically, when charging from power stand 200 to vehicle 10 is performed, vehicle 10 reads the charging power setting value stored in the memory, and controls power converter 114 to attain actual charging power corresponding to the charging power setting value. When discharging from vehicle 10 to power stand 200 is performed, vehicle 10 reads the discharging power setting value stored in the memory, and controls power converter 114 to attain actual discharging power corresponding to the discharging power setting value.

As described above, the power control system according to the present embodiment is configured to allow the user to separately set the charging power setting value and the discharging power setting value. Accordingly, the actual charging power (charging speed) and discharging power (discharging speed) can be independently matched to respective magnitudes suitable to respective situations. Hence, the charging and discharging of power storage device 100 of vehicle 10 can be appropriately managed in accordance with a situation.

Particularly, in the power control system according to the present embodiment, the user can set the charging power setting value and the discharging power setting value using user terminal 700. Therefore, even when the user is at a location distant away from vehicle 10 or power facility 20, the user can set the charging power setting value and the discharging power setting value from user terminal 700 carried by the user.

<Modification 1>

In FIG. 2 above, it has been exemplarily illustrated that the respective ranges of the charging power and discharging power that can be set by the user are set to have the same width (0 kw to 7 kw) and the respective maximum values of the charging power and discharging power that can be set by the user are set to the same value (7 kw).

However, the range of the discharging power that can be set by the user may be set to be larger than the range of the charging power that can be set by the user. Moreover, the maximum value of the discharging power that can be set by the user may be set to be larger than the maximum value of the charging power that can be set by the user.

Figure 5:
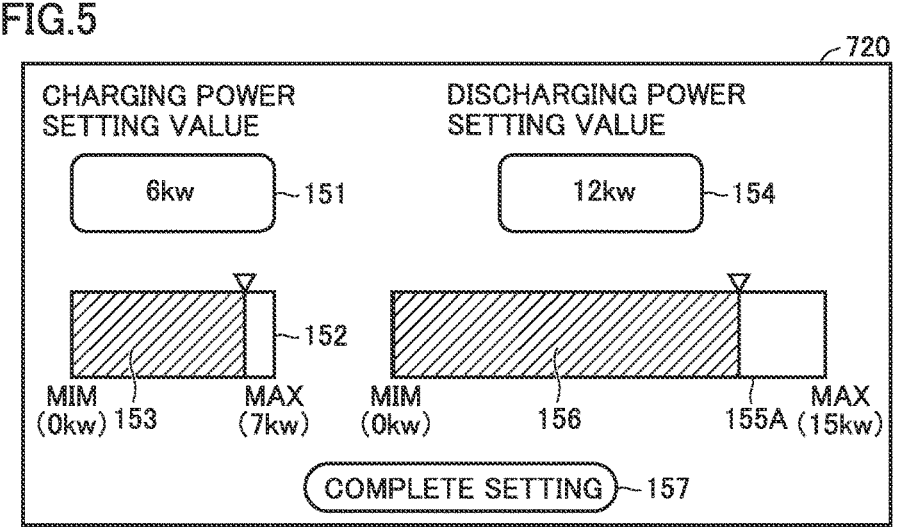
FIG. 5 is a second diagram showing an exemplary setting screen presented on the user terminal.

FIG. 5 shows an exemplary setting screen presented on the display of HMI device 720 of user terminal 700 according to a modification 1. The setting screen shown in FIG. 5 is obtained by changing setting bar 155 of the setting screen shown in FIG. 2 to a setting bar 155A.

As shown in FIG. 5, the width of setting bar 155A (that is, the range of the discharging power that can be set by the user) is set to be larger than the width of setting bar 152 (the range of the charging power that can be set by the user). Accordingly, the adjustment range of the discharging power is secured to be wider than the adjustment range of the charging power. Accordingly, requests for discharging by the user can be responded in many cases. On the other hand, the adjustment range of the charging power is restricted to be smaller than the adjustment range of the discharging power. Accordingly, power supplied from power facility 20 to vehicle 10 can be suppressed from being varied excessively. This leads to suppression of occurrence of large power variation (so-called "flicker") in loading device 400 or the like connected to power switchboard 510 due to the supply of power from power facility 20 to vehicle 10.

Moreover, as shown in FIG. 5, the value of the charging power corresponding to the right end of setting bar 155A (i.e., the maximum value of the discharging power that can be set by the user; "15 kw" in the example shown in FIG. 5) is set to be larger than the value of the charging power corresponding to the right end of setting bar 152 (i.e., the maximum value of the charging power that can be set by the user; "7 kw" in the example shown in FIG. 5). Hence, even when the user requests to promptly discharge power from vehicle 10 to power facility 20, the request can be responded. On the other hand, the maximum value of the charging power is restricted to be smaller than the maximum value of the discharging power. Accordingly, the power supplied from power facility 20 to vehicle 10 is suppressed from being too large. Hence, power in loading device 400 or the like connected to power switchboard 510 can be suppressed from being greatly decreased due to the supply of power from power facility 20 to vehicle 10, and breaker 520 can be suppressed from being cut off due to flow of an excessive amount of current from system power supply 500 to power switchboard 510.

<Modification 2>

In the above-described embodiment, it has been illustratively described that the user operates user terminal 700 to set the charging power and the discharging power.

However, when the user may set the charging power and the discharging power by operating HMI device 150 of vehicle 10 or operation panel 360 of HEMS 600.

Figure 6:
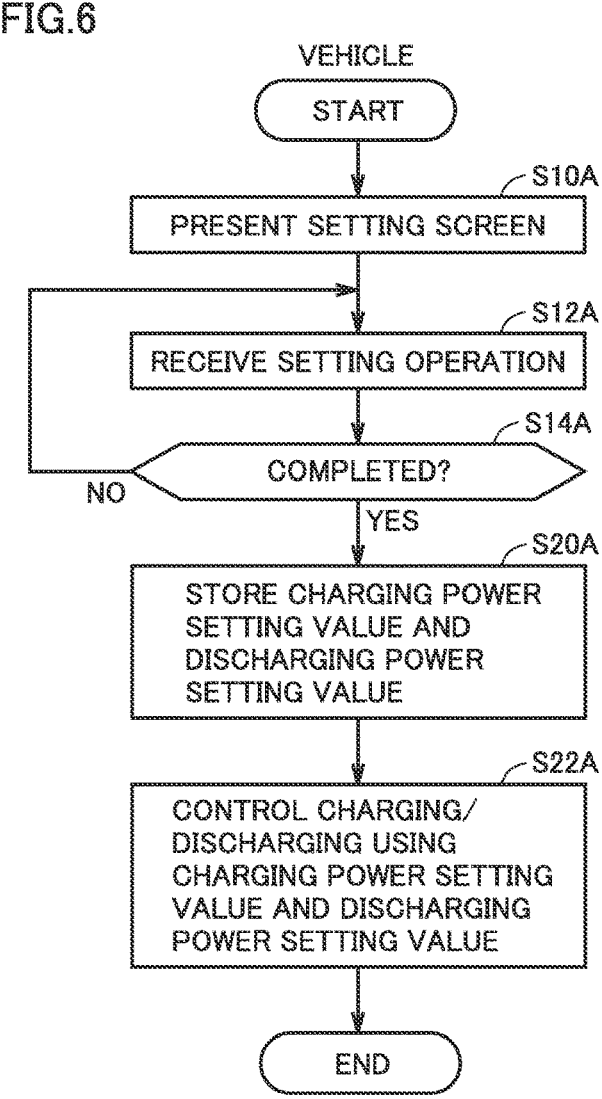
FIG. 6 is a first flowchart showing an exemplary procedure of a process in the vehicle.

FIG. 6 is a flowchart showing an exemplary procedure of a process in vehicle 10 when the user operates HMI device 150 of vehicle 10 to set the charging power and the discharging power.

When the user performs an operation of requesting to set the charging power and the discharging power, vehicle 10 (more specifically, ECU 130 of vehicle 10) presents the setting screen shown in FIG. 2 on the display of HMI device 150 (step S10A).

Next, vehicle 10 receives the user's operation (operation on indication bars 153, 156 of FIG. 2) of setting the charging power and the discharging power (step S12A).

Next, vehicle 10 determines whether or not the user has completed the setting operation by touching setting complete button 157 (step S14A).

When the setting operation has not been completed (NO in step S14A), vehicle 10 returns the process to step S12A.

When the setting operation has been completed (YES in step S14A), vehicle 10 stores, into the memory, the charging power setting value and discharging power setting value set by the user (step S20A). Then, vehicle 10 controls charging and discharging of vehicle 10 using the charging power setting value and the discharging power setting value (step S22A).

In this way, the user may set the charging power setting value and the discharging power setting value by operating HMI device 150 of vehicle 10.

It should be noted that as described above, the user may set the charging power setting value and the discharging power setting value by operating operation panel 360 of HEMS 600.

<Modification 3>

When the charging power setting value and the discharging power setting value are set by the user but the charging power and discharging power respectively corresponding to the charging power setting value and discharging power setting value set by the user cannot be secured due to a low temperature of power storage device 100, control for increasing the temperature of power storage device 100 may be performed.

Figure 7:
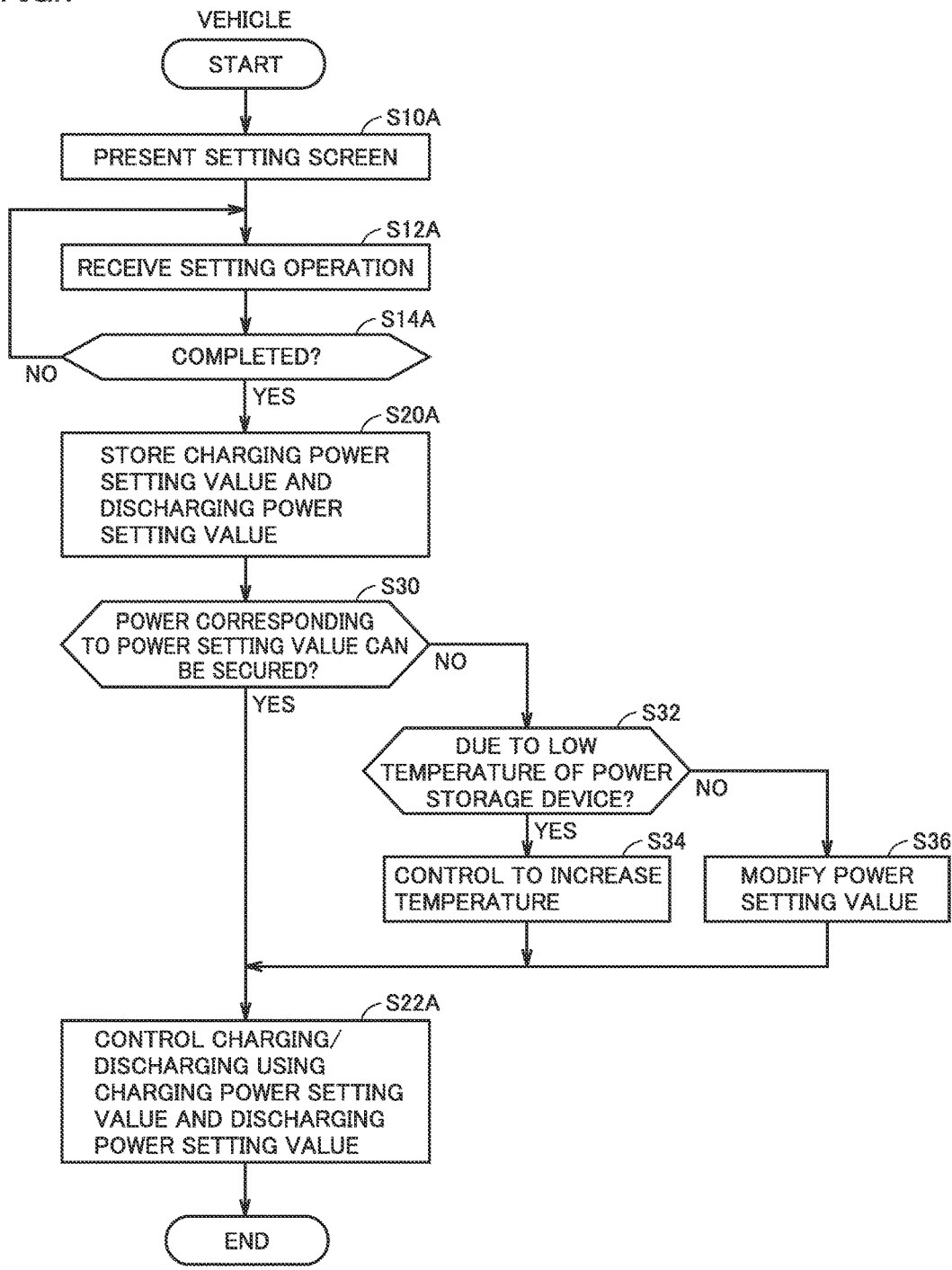
FIG. 7 is a second flowchart showing an exemplary procedure of a process in the vehicle.

FIG. 7 is a flowchart showing an exemplary procedure of a process in vehicle 10 according to a modification 3. The flowchart of FIG. 7 is obtained by adding steps S30 to S36 between step S20A and step S22A in the flowchart of FIG. 6 described above in modification 2. The other steps (steps given the same reference characters as those of the steps in FIG. 6 above) have been already described and therefore will not be described repeatedly here in detail.

Vehicle 10 (more specifically, ECU 130 of vehicle 10) stores, into the memory, the charging power setting value and discharging power setting value set by the user (step S20A).

Then, vehicle 10 determines whether or not the charging power and the discharging power respectively corresponding to the charging power setting value and the discharging power setting value can be secured (step S30). For example, vehicle 10 determines that the charging power and the discharging power respectively corresponding to the charging power setting value and the discharging power setting value can be secured, when the magnitude of the charging power setting value is smaller than the magnitude of power that can be accepted by power storage device 100 and the magnitude of the discharging power setting value is smaller than the magnitude of the power that can be output by power storage device 100.

When it is determined that the charging power and the discharging power respectively corresponding to the charging power setting value and the discharging power setting value can be secured (YES in step S30), vehicle 10 controls the charging and discharging of vehicle 10 using the charging power setting value and the discharging power setting value (step S22A).

On the other hand, when it is not determined that the charging power and the discharging power respectively corresponding to the charging power setting value and the discharging power setting value can be secured (NO in step S30), vehicle 10 determines whether or not a low temperature of power storage device 100 is a reason why the charging power and the discharging power respectively corresponding to the charging power setting value and the discharging power setting value cannot be secured (step S32).

When the low temperature of power storage device 100 is the reason why the charging power and the discharging power respectively corresponding to the charging power setting value and the discharging power setting value cannot be secured (YES in step S32), vehicle 10 performs control for increasing the temperature of power storage device 100 (step S34). For example, vehicle 10 increases the temperature of power storage device 100 by operating motive power output device 135 to exchange power between power storage device 100 and power output device 135. Then, vehicle 10 controls charging and discharging of vehicle 10 using the charging power setting value and the discharging power setting value (step S22A).

On the other hand, when the low temperature of power storage device 100 is not the reason why the charging power and the discharging power respectively corresponding to the charging power setting value and the discharging power setting value cannot be secured (NO in step S32), vehicle 10 modifies the charging power setting value and the discharging power setting value (step S36). Specifically, when the magnitude of the charging power setting value exceeds the magnitude of the power that can be accepted by power storage device 100, vehicle 10 modifies the magnitude of the charging power setting value to be smaller than the magnitude of the power that can be accepted by power storage device 100. Likewise, when the magnitude of the discharging power setting value exceeds the magnitude of the power that can be output by power storage device 100, vehicle 10 modifies the magnitude of the discharging power setting value to be smaller than the magnitude of the power that can be output by power storage device 100. Then, vehicle 10 controls charging and discharging of vehicle 10 using the modified charging power setting value and discharging power setting value (step S22A).

Thus, when the low temperature of power storage device 100 is the reason why the charging power setting value and discharging power setting value set by the user cannot be secured, the control for increasing the temperature of power storage device 100 may be performed.

It should be noted that in modification 2 above, steps S30 to S36 are added in FIG. 7 between steps S20A and step S22A of the flowchart of FIG. 6; however, steps S30 to S36 may be added between step S20 and step S22 of FIG. 4 in the above-described embodiment.

Moreover, the above-described embodiment and modifications 1 to 3 can be combined appropriately as long as the combination is not technically contradictory.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power control system configured to control power exchanged between a power facility and a vehicle, the power control system comprising:
   a control device configured to control (i) charging from the power facility to the vehicle and (ii) discharging from the vehicle to the power facility; and
   a setting device configured to allow a user to separately set a charging power setting value and a discharging power setting value, wherein
   when the charging from the power facility to the vehicle is performed, the control device is configured to control power charged to the vehicle per unit time to correspond to the charging power setting value set by the user using the setting device, and when the discharging from the vehicle to the power facility is performed, the control device is configured to control power discharged from the vehicle per unit time to correspond to the discharging power setting value set by the user using the setting device.

2. The power control system according to claim 1, wherein a range of the discharging power setting value settable by the user using the setting device is larger than a range of the charging power setting value settable by the user using the setting device.

3. The power control system according to claim 1, wherein a maximum value of the discharging power setting value settable by the user using the setting device is larger than a maximum value of the charging power setting value settable by the user using the setting device.

4. The power control system according to claim 1, wherein the setting device is provided in a communication terminal that is able to be carried by the user of the vehicle.

5. A vehicle configured to exchange power with a power facility, the vehicle comprising:
 a control device configured to control (i) charging from the power facility to the vehicle and (ii) discharging from the vehicle to the power facility; and
 a setting device configured to allow a user to separately set a charging power setting value and a discharging power setting value, wherein
 when the charging from the power facility to the vehicle is performed, the control device is configured to control power charged to the vehicle per unit time to correspond to the charging power setting value set by the user using the setting device, and
 when the discharging from the vehicle to the power facility is performed, the control device is configured to control power discharged from the vehicle per unit time to correspond to the discharging power setting value set by the user using the setting device.

6. The vehicle according to claim 5, wherein a range of the discharging power setting value settable by the user using the setting device is larger than a range of the charging power setting value settable by the user using the setting device.

7. The vehicle according to claim 5, wherein a maximum value of the discharging power setting value settable by the user using the setting device is larger than a maximum value of the charging power setting value settable by the user using the setting device.

* * * * *

UNITED STATES PATENT AND TRADEMARK OFFICE
CERTIFICATE OF CORRECTION

PATENT NO. : 10,875,421 B2  
APPLICATION NO. : 16/193642  
DATED : December 29, 2020  
INVENTOR(S) : Shinji Ichikawa Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor, city, delete "Toyota" and insert --Toyota-shi Aichi-ken--, therefor.

Item (73), assignee, city, delete "Toyota" and insert --Toyota-shi Aichi-ken--, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*